though apparently unavoidable decomposition of the formamidine sulphinic acid is completed by continuous addition of an activator solution. The quantity of activator required is governed by the reaction temperature. Between 20° C. and 80° C., 0.05 to 2 parts by weight of formamidine sulphinic acid are required per 100 parts by weight of monomer.

United States Patent [19]
Nolte et al.

[11] 4,338,238
[45] Jul. 6, 1982

[54] PROCESS FOR THE PRODUCTION OF POLYCHLOROPRENE LATICES RICH IN SOLID MATTER

[75] Inventors: Wilfried Nolte, Leverkusen; Wilfried Keller, Dormagen; Heinz Esser, Burscheid, all of Fed. Rep. of Germany

[73] Assignee: Bayer Aktiengesellschaft, Leverkusen, Fed. Rep. of Germany

[21] Appl. No.: 201,760

[22] Filed: Oct. 29, 1980

[30] Foreign Application Priority Data

Nov. 2, 1979 [DE] Fed. Rep. of Germany ....... 2944152

[51] Int. Cl.$^3$ ............................................. C08L 00/00
[52] U.S. Cl. ................................... 524/706; 526/193; 526/233; 526/295; 524/764; 524/834; 524/747
[58] Field of Search ................... 260/29.7 P; 526/193, 526/233, 295

[56] References Cited
U.S. PATENT DOCUMENTS

| | | | |
|---|---|---|---|
| 2,589,919 | 3/1952 | Arundale et al. | 260/82.3 |
| 3,651,037 | 3/1972 | Snow, Jr. | 260/92.3 |
| 4,163,091 | 7/1979 | Pettelkau et al. | 526/208 |

*Primary Examiner*—Joseph L. Schofer
*Assistant Examiner*—B. Lipman
*Attorney, Agent, or Firm*—Connolly and Hutz

[57] ABSTRACT

A process for polymerizing chloroprene which may contain as much as 50% by weight of a copolymerizable monomer, in an alkaline aqueous emulsion, of which the alkali ions at least partially consist of potassium, into a latex rich in solid matter having a solid content of from 50 to 65% by weight in the presence of an alkali salt of disproportionated abietic acid and a formaldehyde condensate with naphthalene sulphonic acid and also an alkali hydroxide, whereby polymerization is carried out until there is a conversion of more than 90% characterized in that (a) the aqueous phase contains from 2.8 to 3.8 parts by weight of an alkali salt of disproportionated abietic acid, from 0.3 to 2.0 parts by weight of a formaldehyde condensate of a naphthalene sulphonic acid and from 0.25 to 0.75 parts by weight of an alkali phosphate and/or polyphosphate, based on 100 parts by weight of monomer, and (b) polymerization is initiated using formamidine sulphinic acid.

2 Claims, No Drawings

PROCESS FOR THE PRODUCTION OF POLYCHLOROPRENE LATICES RICH IN SOLID MATTER

The invention relates to a process for the production of polychloroprene latices rich in solid matter by means of aqueous emulsion polymerisation of chloroprene optionally with other comonomers in the presence of alkali salts of disproportionated abietic acid, alkali hydroxide, the formaldehyde condensate of naphthalene sulphonic acid and a phosphate, whereby at least a part of the alkali ions consists of potassium and polymerisation is initiated by formamidine sulphinic acid.

Polychloroprene latices rich in solid matter are required for many uses and have solid contents of more than 50% by weight up to approximately 65% by weight.

Until recently, only two-stage production processes were known and used. In this case, in the first stage, and approximately 30 to 35% latex is produced by emulsion polymerisation. In a second stage, this is concentrated to a solid content of 50 to 65% by weight. This two-stage process has disadvantages, e.g. high production costs, loss of material and a waste water charge during the concentration stage and also a certain reduction in the colloidchemical stability of the latex.

During the emulsion polymerisation of polychloroprene latices rich in solid matter, two problems in particular must be overcome. If the proportion of water in the conventional formulation for approximately 35% latex is reduced to such an extent than an approximately 60% latex would be produced, then the rate of the reaction is decreased, and the viscosity of the reaction mixture increases so considerably that it is impossible to agitate the mixture easily using a stirrer and it is also impossible effectively to remove the heat from polymerisation. Due to these reasons, it is also impossible to terminate polymerisation as usual at a from 60 to 70% conversion. The proportion of water in the reaction mixture would be too small, the viscosity too high. Therefore, in the direct polymerisation of latices rich in solid matter, the conversion carried to more than 85%, dependent on the required solid matter concentration.

The possibility is described in German Offenlegungsschrift Nos. 2,008,674; 2,047,450 and 2,603,833 of directly obtaining a polychloroprene latex rich in solid matter by polymerisation.

According to these publications, the object of producing a latex rich in solid matter and having a desirable colloid stability may be achieved.

(a) by using from 1.7 to 2.7 parts of disproportionated abietic acid and up to approximately 2.5 parts of a formaldehyde condensate of naphthalene sulphonic acid, if the cations of the salts and the base which is used consist either or completely of potassium (German Offenlegungsschrift No. 2,008,674), (b) by adhering to the conditions mentioned under (a) and also using from 0.15 to 0.5 parts of a polymerised unsaturated fatty acid (German Offenlegungsschrift No. 2,047,450), (c) by using from 2.0 to 6.0 parts of disproportionated abietic acid, whereby a part may be replaced by from 0.05 to 3.0 parts of alkali salts combined with fatty acid, and also using from 0.01 to 1.0 part of non-ionic emulsifiers (German Offenlegungsschrift No. 2,603,833).

In the latter case, potassium ions do not have to be used. All the figures in parts are parts by weight, based on 100 parts by weight of monomer.

These production processes which have been described have essentially the following disadvantages: during polymerisation, difficulties arise either in regard to an inadequate conversion or a too high viscosity, the finished latex has inadequate characteristics in terms of use, particularly a colloid-chemical stability which is too low (zinc oxide stability).

It has now been found that these disadvantages may be avoided when the measures according to the invention are taken in the production of polychloroprene latices rich in solid matter.

Therefore, the present invention provides a process of polymerising chloroprene which may contain up to 50% by weight of a copolymerisable monomer, in an alkaline, aqueous emulsion, the alkali ions of which consist at least partially of potassium, into a latex rich in solid matter having a solid content of from 50 to 65% by weight in the presence of an alkali salt of disproportionated abietic acid and a formaldehyde condensate with naphthalene sulphonic acid, and also an alkali hydroxide, whereby polymerisation is carried out up to a conversion of more than 90%, which is characterised in that (a) the aqueous phase contains from 2.8 to 3.8 parts by weight of disproportionated abietic acid, from 0.3 to 2.0 parts by weight of a formaldehyde condensate of naphthalene suphonic acid and from 0.25 to 0.75 parts by weight of a phosphate or polyphosphate, and b) polymerisation is initiated by adding formamidine sulphinic acid.

According to the process of the invention, chloroprene may be polymerised singly or together with other monomers. As much as 50% by weight of the chloroprene may be replaced by comonomers such as 2,3-dichlorobutadiene, vinyl aromatics, for example, styrene, (meth) acrylonitrile or butadiene.

In order to obtain solid contents of from 50 to 65% by weight, the polymerisation mixture must contain from 55 to 90 parts by weight of water and the polymerisation must be continued until there is a conversion of more than 90%. The unconverted monomers are removed from the latex by stripping with steam or by vacuum evaporation.

Polymerisation is carried out according to known processes such as the batch or continuous feed process, but is preferably carried out continuously as emulsion polymerisation. The aqueous phase contains the proportions according to the invention of from 2.8 to 3.8, preferably from 3.2 to 3.6 parts by weight of disproportionated abietic acid, from 0.3 to 1.0, preferably from 0.5 to 0.7 parts by weight of formaldehyde condensate of naphthalene sulphonic acid and from 0.25 to 0.75, preferably from 0.4 to 0.6 parts by weight of a phosphate or polyphosphate and also from 0.3 to 1.2 parts of alkali hydroxide, so that, at the end of polymerisation, an alkaline pH results which is preferably approximately from 11 to 13. The alkali ions which are introduced with the mentioned auxiliary agents, emulsifiers and phosphate, must consist at least partially of potassium. A proportion of approximately from 5 to 20 mval per 100 g of chloroprene is considered to be sufficient.

Small quantities of other emulsifiers of anionic or non-ionic nature may be also be present without impairing the present process.

Sodium hydroxide with the simultaneous use of potassium salts of the emulsifiers and/or phosphate may be used as alkali hydroxide. However, the process is preferably carried out using the sodium salts of the emulsifiers, and phosphate and potassium hydroxide is used to adjust the pH.

Alkali salts of orthophosphoric acid, diphosphoric acid or hexameta phosphoric acid may be used as phosphates.

Polymerisation is initiated and maintained using formamidine sulphinic acid in the form of a from 1.0% to 2.5% by weight aqueous solution. The required quantity depends on the polymerisaton process which is used and is usually 3.0 parts by weight (a continuous process) to 10.0 parts by weight (a discontinuous process) at 100 parts by weight of monomer (calculated on a 2.5% by weight solution).

The characteristics of the polymer may be changed during polymerisation by the presence of modifying agents such as an alkyl mercaptan, sulphur or a dialkyl xanthogen disulphide, and may be adjusted according to requirements.

The polychloroprene latices according to the invention may be produced batch-wise as for known emulsion polymerisation or continuously.

It is possible to carry out the process completely charge-wise, whereby the total quantity of monomer(s) is emulsified in the aqueous emulsifier solution and polymerisation is initiated and maintained by adding the initiator. The initiator may be added intermittently but it is more advantageous if it is added continuously.

Particularly when polymerising large quantities, it is advantageous to start polymerisation with a part of the monomer(s) and the aqueous emulsifier solution and to add the rest of the monomer(s) and the emulsifier solution and also the initiator solution during the course of the reaction.

The polymerisation temperature may be selected in the range of from 10° C. to 60° C., preferably from 30° C. to 55° C. The usual conditions of emulsion polymerisation such as stirring in order to maintain the dispersion and for homogenization and also completely excluding atmospheric oxygen by expulsion using an inert gas such as nitrogen, are maintained. Polymerisation is carried out until there is a conversion of more than 80%, preferably as high as from 90 to 98% and is then terminated by cooling or stopping off using a short stopper such as diethyl hydroxylamine or by immediate demonomerisation, e.g. by stripping using steam. Demonomerisation is carried in any case. The finished latex is also filtered in order to separate even the smallest quantities of separated material. Antioxidants may optionally also be added to the latex.

The present invention is particularly suitable for the continuous production of polychloroprene latex. In addition to economic advantages, continuous production also provides technical advantages. Removing the polymerisation heat is particularly problematic due to the activity of the chloroprene and its high concentration in the reaction mixture. Reactors in the form of large stirring vessels, as are used in batch-wise polymerisation, generally have unfavourable area/volume ratios which are inadequate for heat removal. Batch-wise polymerisation with a continuous supply of the reaction mixture, adapted to the heat removal is possible but has disadvantages, namely an uneconomical use of the volume of the vessel and a duration time extending over a complete conversion for a part of the latex particles. With continuous polymerisation in a stirring vessel cascade, these disadvantages may be avoided or may at least be greatly reduced. The individual vessels in the cascade are substantially smaller than one vessel for batch-wise polymerisation so that the heat may be reliably removed.

The invention is explained with reference to the following Examples. The comparative Examples which are also given show both the superiority of the latices produced according to the invention compared to the latices produced according to the Examples of the previously mentioned Offenlegungsschrift publications, as well as the necessity of combining the measures in accordance with the invention in order to obtain a latex having improved characteristics. All quantities in parts are parts by weight, based on 100 parts by weight of monomer.

The following are stated as essential characteristics: concentration, viscosity, zinc oxide stability, calcium chloride stability, strength of the vulcanised polymer film. Other characteristics, such as defo number HC1 separation and Shore hardness are not influenced by the measures according to the invention or are only influenced to a small extent.

By using many mixing components, predominantly zinc oxide, fillers accelerators, resins among others, the chemical stability of latices is reduced. Therefore, it is important to keep the chemical stability at a determined level in order later to ensure a reliable processibility.

A successful method lies in measuring the zinc oxide stability. However, the calcium chloride stability is just as important. On one hand, this measuring method indicates how much electrolyte, specifically calcium chloride, the latex can tolerate without coagulating and, on the other hand, whether it may be completed coagulated with electrolytes at all. The latter is an essential requirement for many uses.

When testing the zinc oxide stability, the latex which is to be tested is diluted with 4% by weight aqueous solution of sodium isobutyl-naphthalene sulphonate to a concentration of 25% by weight. 180 g of zinc oxide dispersion of the following composition are added to 200 g of this diluted latex: 60 g of active zinc oxide, dispersed in 120 g of a 5% by weight aqueous solution of a formaldehyde condensate sodium naphthalene sulphonate. The mixture is introduced into a beaker of Va steel ($\phi$70 mm, H 100 mm+30 mm edge, 1 mm wall thickness, polished) and this is introduced into a water bath which is heated to 100° C. The latex mixture is then stirred using a thermometer until coagulation takes place. The temperature of the mixture when coagulation starts and the time which has elasped until then are used to measure the zinc oxide stability. If coagulation has not commenced after 240 seconds, the measuring is interrupted.

In order to measure the calcium chloride stability, 20 g of the latex are introduced into a 150 ml porcelain beaker. A 10% by weight aqueous calcium chloride solution is added dropwise into the latex from a burette with slow stirring using a glass rod until all the rubber substance has precipitated. The addition of the calcium chloride solution is frequently interrupted in order to crush and press out the coagulate which has already precipitated so that the latex which is enveloped by the coagulate may also be used for the measurement.

Usable polychloroprene latices have a zinc oxide stability of more than 60° C., good latices have a zinc oxide stability of more than 65° C. The calcium chloride stability must be between 3.0 and 5.0 ml.

A polychloroprene latex having a zinc oxide stability which is too low may be improved in this respect by adding non-ionic emulsifiers. However, the calcium chloride stability is simultaneously increased which is undesirable. Calcium chloride stabilities of 5.0 ml and more mean that the latex may no longer be precipitated easily and in particular no longer in a complete manner. In these cases, a milky turbed serum which still contains polymer is obtained. Therefore, the possibility of subsequently improving a latex in its zinc oxide stability is only very slight.

In order to determine the tensile strength, a latex mixture is produced from a quantity of latex which contains 100 parts of polymer dry substance, with a dispersion of 7.5 parts of active zinc oxide, 2.0 parts of diphenyl thiourea and 1.0 part of diphenyl guanidine in 18.5 parts of a 5% by weight aqueous solution of a formaldehyde condensate of sodium naphthalene sulphonate. A film which is 1 mm thick is produced from this latex mixture by means of the "clay plate method" (drying a 1 mm thick film on a clay plate at room temperature).

The tensile strength is measured on a reduced standard rod 1 according to DIN 53 504. The tensile strengths should be at least 17.0 MPa. Tensile strengths which are more than 18 MPa considered to be good figures.

EXAMPLE (1)

A solution of 50 parts by weight of water, 5.0 parts by weight of 70% by weight disproportionated abietic acid, 0.75 part by weight of formaldehyde condensate of napthalene sulphonic acid, 0.9 part by weight of potassium hydroxide and 0.5 part by weight of sodium hexametaphosphate and also 100.0 parts by weight of chloroprene with 0.1 parts by weight of dodecyle mercaptan are introduced into a reaction vessel which is equipped with a stirrer, a reflux condenser, a dropping funnel and also a nitrogen inlet and outlet. Atmospheric oxygen in the vessel is expelled by nitrogen and the temperature is raised to 44° C.

2.5% by weight of aqueous formamidine sulphinic acid solution are added dropwise so that a uniform polymerisation takes place. After 3.5 hours and after using 8.6 parts by weight of the formamidine sulphinic acid solution, a conversion of 95% is achieved. Polymerisation is terminated by adding 1.0 parts of 25% by weight diethyl hydroxamine solution and by cooling. A latex free of separated material with a pH of 13.2 is obtained. The chloroprene which is not converted is removed under vacuum by slight distillation. The solid content is 58.2%.

Other Examples and comparative Examples with their results in terms of use are given in Tables 1 and 2. The experiments were carried out as from Example 1.

| Example | 1 | 2 | 3 | 4 | 5 | 6 |
|---|---|---|---|---|---|---|
| Water | 50.0 | 50.0 | 50.0 | 50.0 | 50.0 | 50.0 |
| disproportionated abietic acid | 3.50 | 3.36 | 3.36 | 3.36 | 3.36 | 2.80 |
| formaldehyde cond. of naphthalene sulphonic acid | 0.75 | 0.65 | 0.65 | 0.35 | 0.80 | 0.65 |
| Potassium hydroxide | 0.9 | 0.9 | 0.9 | 0.9 | 0.9 | 0.9 |
| Sodiumhexametaphosphate | 0.5 | 0.75 | 0.25 | 0.5 | 0.5 | 0.5 |
| chlorophene | 100.0 | 100.0 | 100.0 | 100.0 | 100.0 | 100.0 |
| Dodecylmercaptan | 0.1 | 0.05 | 0.05 | 0.05 | 0.05 | 0.05 |
| Formamidine sulphinic acid, 25% by weight | 8.6 | 10.0 | 9.25 | 10.0 | 10.0 | 11.25 |
| Polymerisation temperature (°C.) | 44 | 45 | 45 | 45 | 45 | 45 |
| Polymerisation time (hours) | 3.5 | 4 | 3.75 | 4 | 4 | 4.5 |
| Conversion (%) | 95 | 95 | 96.5 | 98 | 96.5 | 96 |
| Solid content[1] (%) | 58.2 | 58.1 | 59.1 | 58.5 | 58.3 | 58.8 |
| Separated material | none | none | none | none | none | none |
| pH | 13.2 | 13.0 | 13.1 | 13.1 | 13.0 | 13.0 |
| viscosity[2] (cP) | 180 | 130 | 440 | 180 | 80 | 40 |
| zinc oxide stability (sec/°C.) | 134/80 | >240/97 | 118/61 | 185/81 | 172/79 | >240/97 |
| Calcium chloride stability (ml) | 3.5 | 4.2 | 4.1 | 4.2 | 3.9 | 4.5 |
| strength[3] (MPa) | 17.4/17.3 | 18.3/17.7 | 18.+/18.5 | 17.2/17.7 | 18.7/17.9 | 17.5/17.1 |

| Comparative Examples | 7 | 8 | 9 | 10 | 11 | 12 | 13 |
|---|---|---|---|---|---|---|---|
| Water | 50.0 | 50.0 | 50.0 | 50.0 | 50.0 | 50.0 | 50.0 |
| disproportionated abietic acid | 1.9 | 1.9 | 3.5 | 1.9 | 3.5 | 2.66 | 3.5 |
| formaldehyde cond. of naphthalene sulphonic acid. | 1.0 | 2.0 | 0.75 | 1.0 | — | — | 0.75 |
| potassium hydroxide | 1.1 | 1.1 | 0.9 | 1.1 | 0.9 | 0.75 | 0.9 |
| iso-nonyphenol with 10 EO | — | — | — | — | 0.2 | — | — |
| Benzyl-phenylphenol with 14 EO | — | — | — | — | — | 0.01 | — |
| Dimerised linoleic acid | — | 0.32 | — | — | — | — | — |
| Trisodiumphosphate | — | — | — | — | 0.5 | — | — |
| Sodiumhexametaphosphate | — | — | 0.5 | — | — | — | — |
| Chloroprene | 100.0 | 100.0 | 100.0 | 100.0 | 100.0 | 100.0 | 100.0 |
| Dodecylmercaptan | 0.1 | 0.1 | 0.1 | 0.1 | 0.1 | 0.1 | 0.1 |
| Sodium Sulphite | 0.1 | 0.1 | 0.1 | — | — | — | — |
| Dextrose | 0.1 | 0.1 | 0.1 | — | — | — | — |
| Water 10.0 Potassium peroxodisulphate 0.5 Sodium-2-anthraquinone sulphonate 0.0125 | 10.5 | 9.6 | 4.5 | — | — | — | — |
| Formamidinesulphinic acid 2,5% | — | — | — | 19.0 | 21.0 | | |
| Polymerisation temperature (°C.) | 44 | 44 | 44 | 44 | 44 | 44 | 44 |
| Polymerisation time (hours) | 4 | 4 | 4 | 4 | 3.5 | 4 | 3 |
| Conversion (%) | 36 | 100 | 98 | 42 | 92.5 | 94 | 94 |
| Solid content (%) | | 60.4 | 61.8 | | 53.1 | 58.2 | 60.3 |

-continued

| Separated material (%) | too small | 4 | none | conversion | none | none | none |
|---|---|---|---|---|---|---|---|
| pH | conversion | 12.8 | 12.8 | too small | 12.3 | 12.5 | 12.7 |
| viscosity (cP) | | 3880 | 400 | | 20 | 420 | 640 |
| zinc oxide stability (°C.) | | Latex too viscous | Latex full of speeks after 3 days | | 75 | 47 | 51 |
| calcium chloride stability (ml) | | | | | 2.9 | 4.2 | 3.0 |
| strength (MPa) | | | | | 15.4/16.5 polymerisation starts with difficulty. Use of initiator too high. | 17.6/17.1 | 17.3/17.2 |

[1] after removing the unconverted monomers
[2] Brookfield, spindle 3, 60 Rpm
[3] Figures after 30/40 min. vulcanisation

We claim:

1. A process for polymerising chloroprene which may contain as much as 50% by weight of a copolymerisable monomer; in an alkaline aqueous emulsion, of which the alkali ions at least partially consist of potassium, into a latex rich in solid matter having a solid content of from 50 to 65% by weight in the presence of an alkali salt of disproportionated abietic acid and a formaldehyde condensate with naphthalene sulphonic acid and also an alkali hydroxide, whereby polymerisation is carried out until there is a conversion of more than 90% characterised in that (a) the aqueous phase contains from 2.8 to 3.8 parts by weight of an alkali salt of disproportionated abietic acid, from 0.3 to 2.0 parts by weight of a formaldehyde condensate of a naphthalene sulphonic acid and from 0.25 to 0.75 parts by weight of an alkali phosphate and/or polyphosphate, based on 100 parts by weight of monomer, and (b) polymerisation is initiated with an initiator consisting of formamidine sulphinic acid.

2. A process according to claim 1, characterised in that the aqueous phase contains from 3.2 to 3.6 parts by weight of an alkali salt of disproportionated abietic acid, from 0.5 to 0.7 part by weight of an alkali salt of formaldehyde condensate of naphthaline sulphonic acid and from 0.4 to 0.6 part by weight of an alkali phosphate and/or alkali polyphosphate.

* * * * *